US007092602B2

(12) United States Patent
Park et al.

(10) Patent No.: US 7,092,602 B2
(45) Date of Patent: Aug. 15, 2006

(54) METHOD OF FABRICATING POLYMER WAVEGUIDES FOR PASSIVE ALIGNMENT TO OPTICAL FIBERS IN AN OPTICAL MODULE

(75) Inventors: Suntak Park, Daejeon (KR); Jong Moo Lee, Daejeon (KR); Yongsoon Baek, Daejeon (KR); Joon Tae Ahn, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 0 days.

(21) Appl. No.: 11/009,914

(22) Filed: Dec. 10, 2004

(65) Prior Publication Data

US 2006/0018602 A1   Jan. 26, 2006

(30) Foreign Application Priority Data

Jul. 26, 2004  (KR) .................. 10-2004-0058364

(51) Int. Cl.
*G02B 6/30* (2006.01)
(52) U.S. Cl. ............................ 385/49; 385/52; 385/88
(58) Field of Classification Search .............. 385/39, 385/43, 48, 49, 50, 51, 52, 88–92, 137, 147
See application file for complete search history.

(56) References Cited

U.S. PATENT DOCUMENTS 5,644,667 A    7/1997  Tabuchi 6,671,438 B1   12/2003 Ido et al.
6,760,520 B1 *  7/2004 Medin et al. ................ 385/43

FOREIGN PATENT DOCUMENTS

JP   2001-350051    12/2001
KR   1020040032420   4/2004

OTHER PUBLICATIONS

"A Polymer PLC Platform With a Fiber-Alignment V-Groove for a Low-Cost 10-GbE WWDM Transmitter", M. Takahashi, et al., 2004 IEEE, vol. 16, No. 1, Jan. 2004.
"Passive Aligned Hybrid Integrated WDM Trnsceiver Module Using Planar Lightwave Circuit Platform", H. Okano, et al, IEICE Trans. Eletron. vol. E80-C, No. 1. Jan. 1997.

* cited by examiner

*Primary Examiner*—Phan Palmer
(74) *Attorney, Agent, or Firm*—Blakely Sokoloff Taylor & Zafman (57) ABSTRACT

Is provided a method of forming a polymer waveguide for passive alignment to an optical fiber in an optical module. A groove mounting an optical fiber thereon is formed on a substrate, and a shielding layer pattern is formed to selectively shield the groove. Polymer layers for an optical waveguide, which extend to the shielding layer pattern, are formed on the substrate, and the layers are patterned, thereby forming a polymer waveguide. The shielding layer is removed, and the groove is exposed. An optical fiber aligned to the optical waveguide is mounted on the exposed groove.

20 Claims, 6 Drawing Sheets

METHOD OF FABRICATING POLYMER WAVEGUIDES FOR PASSIVE ALIGNMENT TO OPTICAL FIBERS IN AN OPTICAL MODULE

BACKGROUND OF THE INVENTION

This application claims the priority of Korean Patent Application No. 2004-58364, filed on Jul. 26, 2004, in the Korean Intellectual Property Office, the disclosure of which is incorporated herein in its entirety by reference.

1. Field of the Invention

The present invention relates to an optical module including an optical waveguide, and more particularly, to a method of fabricating a polymer waveguide with a high passive alignment to an optical fiber in an optical module with the polymer waveguide.

2. Description of the Related Art

An optical module is a key component for an optical communication apparatus for the conversion between an optical signal and an electrical signal. The demand for such an optical module is rapidly increased along with the demand for internet rapidly increasing. The optical module may be classified into three types. For example, there are a optical transmit module for converting electrical signals to optical signals, a optical receive module for receiving transmitted optical signals and converting to electrical signals, and a optical transmit and receive module for combining the functions of the optical transmit module and the optical receive module and performing the functions in one module.

Recently, a study is actively processed on a high reliability, a high speed, and a high capacity of an optical module, and also, a study is actively processed on a low cost of an optical module. As one of the studies to realize the low cost of an optical module, are proposed methods of fabricating an optical module using a flat type optical waveguide circuit to save the cost of optical alignment.

The optical module using a planar optical waveguide includes a region where an optical waveguide is formed, a region where an active device such as a laser diode or a photo diode is mounted, and a region where an optical fiber is coupled with the optical waveguide.

A method of fabricating an optical module using a planar optical waveguide includes a process of forming a platform having an optical waveguide region, an optical active element mounting region, and an optical fiber coupling region on a substrate. Thus, an integral type optical module is proposed. The method of fabricating the integral type optical module is expected to reduce the number of elements used in the module, and to realize the automatization and the low-cost products through a passive alignment.

Most of the integral type optical modules which have been proposed up to now are the case of using a silica waveguide. The method of fabricating the optical module using the silica waveguide includes forming a core layer and clad layers for the silica waveguide on a substrate, and forming a V-shaped groove or etching the portions where active elements are mounted.

SUMMARY OF THE INVENTION

The present invention provides a method of fabricating an optical module including forming a groove for mounting an optical fiber thereon on a substrate before forming a polymer waveguide, and preventing polymer from inflowing into the groove. A shielding layer pattern is employed to prevent the inflow of polymer. The shielding layer may use a dry film photoresist (DFR) as a photoresist-type thin film.

Before fabricating the optical waveguides, since electrodes, solders, and V-shaped grooves are first formed, a step height difference between two align keys for alignment of a photomask and the substate is reduced during a photolithography patterning process, thereby increasing a process alignment accuracy. Therefore, a precise optical module can be fabricated. Further, by employing a DFR as a shielding layer pattern during the formation of the polymer optical waveguide, an optical module for passive alignment to an optical fiber can be fabricated.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout the specification.

A typical integrated optical module uses a silica waveguide. A process of fabricating an optical module using the silica waveguide includes forming a core layer and clad layers for the silica waveguide on a substrate, and then, forming a V-shaped groove or etching the portion on which active elements are mounted.

The typical process of fabricating an optical module may have many problems. For example, a patterning process using a photolithography is performed in order to form a groove for positioning and fixing an optical fiber to an exact position, or to selectively perform the etch. However, in the case of first forming the optical waveguide on the substrate, it seems that it is very difficult to form a pattern for the V-shaped groove or the portion of active elements with a high alignment accuracy or a high precision.

As a step height difference involved in the optical waveguide, a step height different between a photoresisit layer and a photo mask formed thereon to be used for selective exposure is partially increased non-uniformly. In other words, a flatness degree of the photoresist layer is decreased to cause a step height difference, and a distance between the photoresist layer and the photo mask is non-uniform due to the step height difference.

Therefore, it is difficult to exactly set the exposure range of the photoresist layer. Further, it is difficult to pattern the photoresist layer exactly by an exposure or the like due to the step height difference. As such, in the case of using the incorrectly patterned photoresist pattern as an etch mask for an etch process, it is difficult to perform the etch process with precision.

Further, since a subsequent process such as a V-shaped groove etching, a solder deposition, or the like follows the formation of an optical waveguide, the optical waveguide may be damaged or contaminated during the subsequent process. Because of that, it seems that a reproducibility of the fabrication of a platform of the optical module is deteriorated.

Meanwhile, a polymer waveguide is actively studied as an alternative for the silica waveguide. Since the polymer waveguide may be formed on the substrate by a spin coating, and a mass production is easy, it can be fabricated at a low price.

A V-shaped groove for an optical fiber may be formed on the substrate surface, or an etch process for active elements may be performed before forming the polymer waveguide, and the polymer, which is spin-coated on the V-shaped or the U-shaped groove for an optical fiber, may be coated undesirably. Further, the polymer coating may be non-uniform by the step height difference of the substrate surface due to the groove or the like. Thus, the generation of such an undesirable phenomenon may function to deteriorate the alignment accuracy of passive alignment of the polymer waveguide to an optical fiber.

Therefore, in order to solve the problem, the present invention provides a method of fabricating an optical module to increase a passive alignment accuracy of the optical fiber and the polymer waveguide by forming a groove for an optical fiber on a substrate before forming a polymer waveguide, and preventing polymer from flowing into the groove, and preventing the non-uniformity of the polymer coating due to the step height difference of the substrate surface by the groove.

Embodiments of the present invention propose methods of fabricating an optical module employing a polymer waveguide replacing a silica waveguide. Before forming the polymer waveguide on the substrate, a groove for positioning and fixing an optical fiber, for example, a V-shaped or a U-shaped groove, is formed on the substrate.

In the case of forming the groove for guiding the mounting of an optical fiber on the substrate before forming a polymer waveguide, the polymer may flow into the groove during the coating of polymer for the polymer waveguide. Further, the existence of the groove may cause the thickness of the coated polymer layer non-uniform.

In order to prevent the undesired inflow of the polymer into the groove and enhance the uniformity of the polymer coating layer, the embodiments of the present invention propose the use of a shielding layer for covering the V-shaped groove or the like before forming the polymer waveguide. The shielding layer may be formed of a thin film attached to the substrate surface to cover the groove.

Preferably, the shielding layer is formed on the substrate to selectively cover the groove and to expose the rest portion of the substrate. To do so, after attaching a thin film on the substrate, it is preferable to remove the rest portion of the thin film attached to the substrate other than the groove. The shielding layer preferably uses dry film resist (DFR) film being selectively removable with easiness.

DFR is known to have a property of being introduced on the substrate with a film type, and easily attached to the substrate by use of heat. Therefore, it has an advantage of being easily attached. Further, it has an advantage of being easily patterned by exposure and development. Also, it has an advantage of being removable together during the patterning of the polymer waveguide since it has a property of being easily removable by a dry etch.

Figure 1:
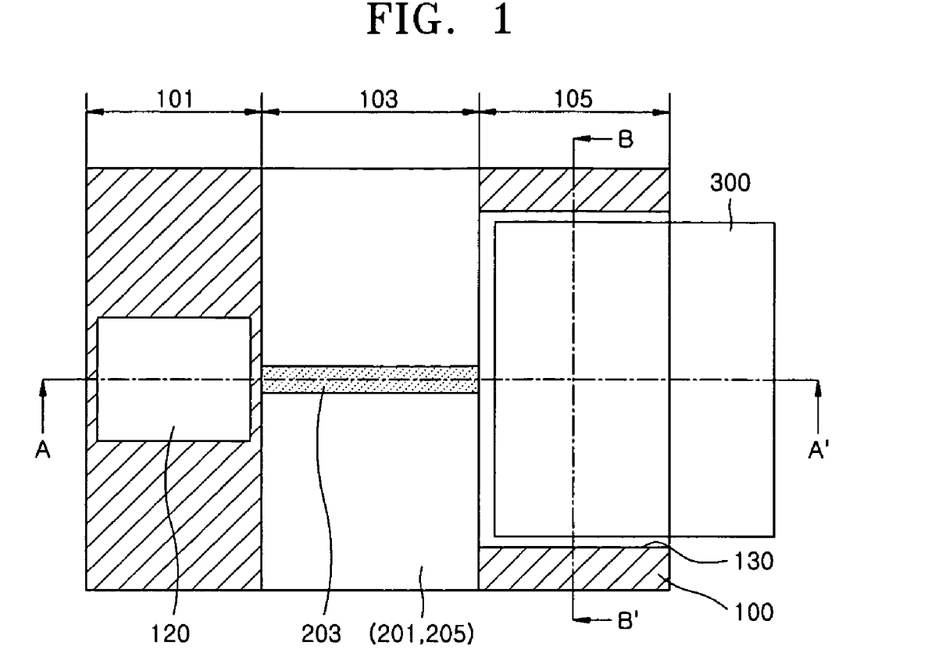
FIG. 1 is a schematic plan view illustrating an optical module including a polymer waveguide according to an embodiment of the present invention.

FIG. 1 is a schematic plan view illustrating an optical module including a polymer waveguide according to an embodiment of the present invention, and FIGS. 2A through 8A are schematic sectional views illustrating a method of fabricating an optical module including a polymer waveguide according to an embodiment of the present invention taken along lines of A–A' of FIG. 1 respectively. It can be understood that the thicknesses or/and depths of layers and grooves depicted in FIGS. 2A through 8A are relatively exaggerated for clarity. FIGS. 2B through 8B are schematic sectional views illustrating a method of fabricating an optical module including a polymer waveguide according to an embodiment of the present invention taken along lines of B–B' of FIG. 1 respectively. It can be understood that the thicknesses or/and depths of layers and grooves depicted in FIGS. 2B through 8B are relatively exaggerated for clarity, and the diameter of the optical fiber is also exaggerated for clarity.

Figure 8A:
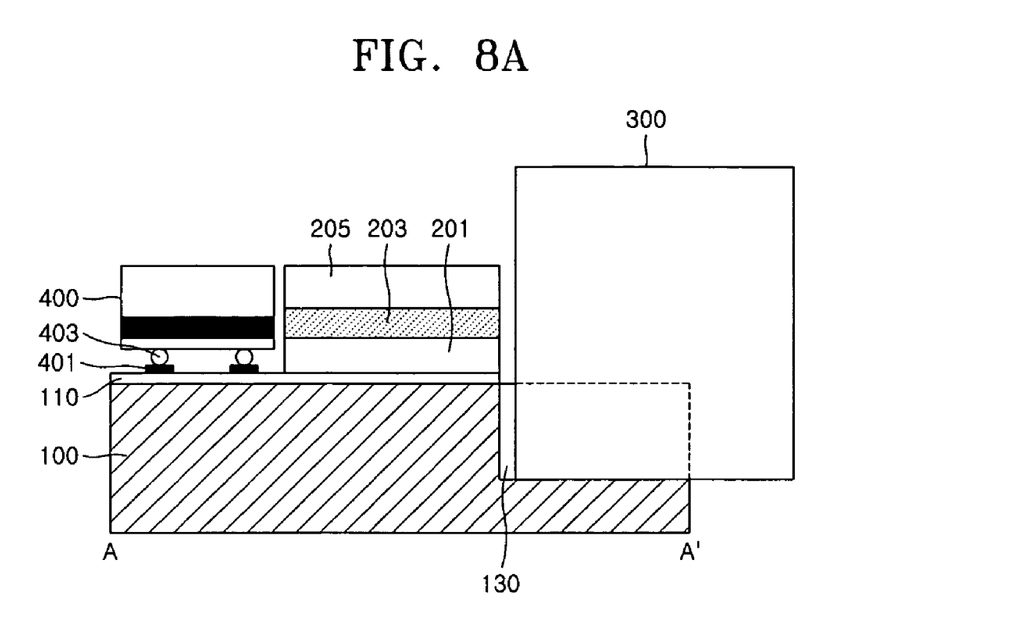
FIGS. 8A and 8B are schematic sectional views illustrating a process of aligning an optical fiber to an optical waveguide according to an embodiment of the present invention taken along lines of A–A' and B–B' of FIG. 1 respectively.

First, referring to FIGS. 1 and 8A, the optical module including the polymer waveguide of the present invention includes an optical active element mounting region 101, an optical waveguide region 103, and an optical fiber coupling region 105 as shown in FIG. 1. Therefore, the substrate 100 of the optical module is structured to include the regions. The substrate 100 may use a silicon substrate.

An optical active element 400 mounted on the optical active element mounting region 101 of the substrate 100 may be a laser diode, a photo diode, an optical modulator, an optical amplifier, or the like. An interconnection line 401, which is composed of a conductive material such as metal, is formed on the substrate 100 of the optical active element mounting region 101 with an insulating layer 110 disposed between them. The insulating layer 110 is disposed for the insulation of the silicon substrate 100 and the interconnection line 401, or the like.

The optical active element 400 is electrically connected to the interconnection line 401 through an electrical connection part such as a solder 403, or the like. The connection part may use an adhesive and conductive material such as soldering instead of the solder 403. The interconnection line 401 is used as a passage for transferring the signal supplied from the outside to the optical active element 400.

An optical waveguide region 103 of the substrate 100 is disposed between the optical active element mounting region 101 and the optical fiber coupling region 105. A polymer waveguide 200 (201, 203, 205) is formed on the optical waveguide region 103 as shown in FIG. 8A. The polymer waveguide 201, 203, 205 includes a lower clad layer 201, a core layer 203, and an upper clad layer 205. At least one component layer or all the component layers of the optical waveguide 200 are composed of polymer.

For example, each of the layers 201, 203, 205 may be formed by spin-coating the polymer suitable for the purpose. The patterning of the optical waveguide 200 may be performed by the patterning using a photolithography or/and an etch process. The height of the core layer 203 is determined considering the optical coupling with the active element 400 mounted on the optical active element mounting region 101.

The optical fiber coupling region 105 may be a region having a V-shaped or a U-shaped groove formed on the substrate 100 for the coupling of the optical fiber 300 and the optical waveguide 200. A groove 130 is formed on the substrate 100 considering the thickness of the optical fiber 300 such that the height of the core layer 203 of the optical waveguide 200 is substantially the same as that of the core layer at the center of the optical fiber 300.

As described above, the optical module according to embodiments of the present invention may be fabricated in accordance with the process sequences shown in FIGS. 2A and 2B through 8A and 8B.

Figure 2A:
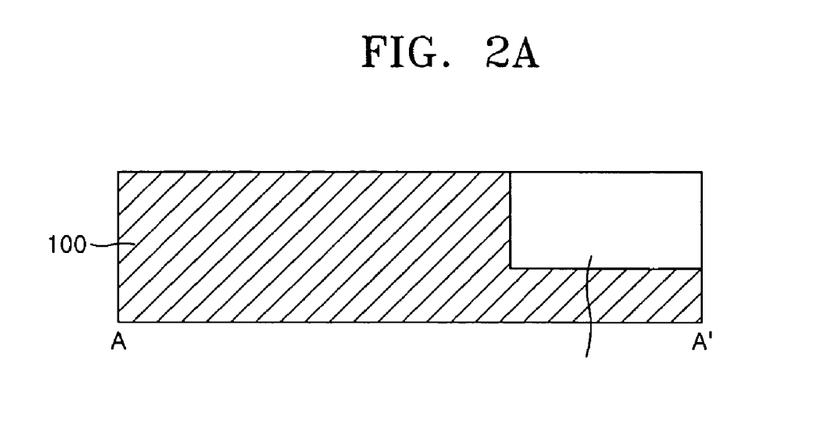
FIGS. 2A and 2B are schematic sectional views illustrating a process of forming a groove for mounting an optical fiber thereon on an optical module substrate according to an embodiment of the present invention taken along lines of A–A' and B–B' of FIG. 1 respectively.
Figure 2B:
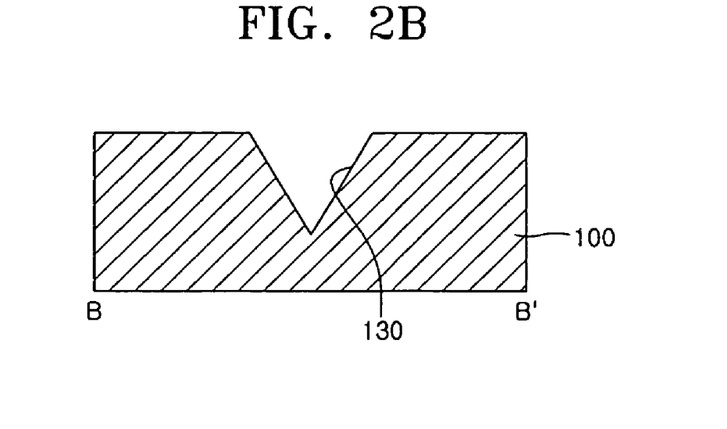

FIG. 2A is a schematic sectional view taken along a line of A–A' of FIG. 1 illustrating a process of forming a groove 130 for mounting an optical fiber on an optical module substrate 100 according to an embodiment of the present invention. FIG. 2B is a schematic sectional view taken along a line of B–B' of FIG. 1 illustrating a process of forming a groove 130 for mounting an optical fiber on an optical module substrate 100 according to an embodiment of the present invention.

Referring to FIGS. 2A and 2B, the substrate 100 for an optical module may be composed of resin, glass, ceramic, metal material, or the like. Nonetheless, the substrate 100 for an optical module preferably uses a silicon substrate on which a precise process such as a selective etching can be performed relatively easily. Therefore, an embodiment of the present invention will be explained taking an example of the case of using the silicon substrate 100.

In the case of using the silicon substrate 100, the groove 130 for mounting an optical fiber is formed long with a V-shape on the optical fiber coupling region 105 (FIG. 1) using a selective wet etch. A silicon nitride layer (SiN) is formed on the substrate 100 as an etch mask, using a photolithography process, and a solution including potassium hydroxide (KOH) may be used as wet etchant. The groove 130 may be formed with a width of about 140 μm in the case that the diameter of the optical fiber is about 125 μm.

Figure 3A:
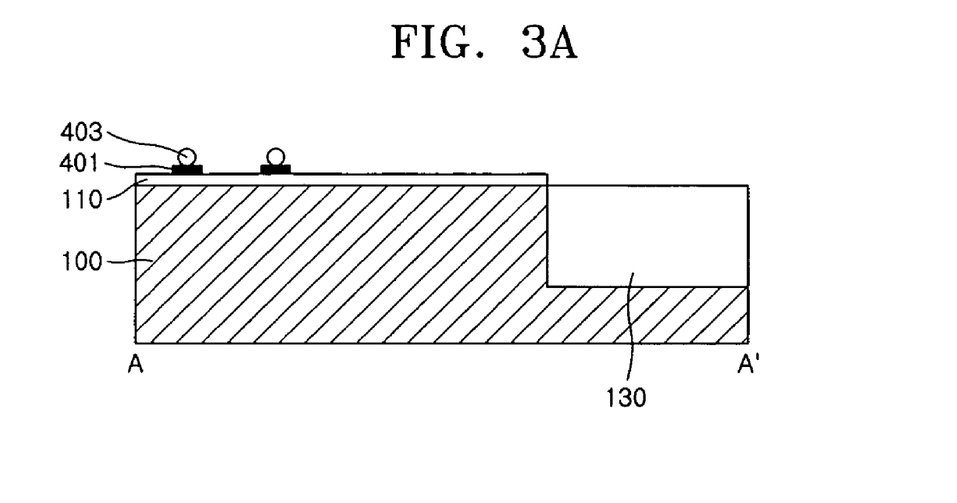
FIGS. 3A and 3B are schematic sectional views illustrating a process of forming an interconnection line and a solder according to an embodiment of the present invention taken along lines of A–A' and B–B' of FIG. 1 respectively.
Figure 3B:
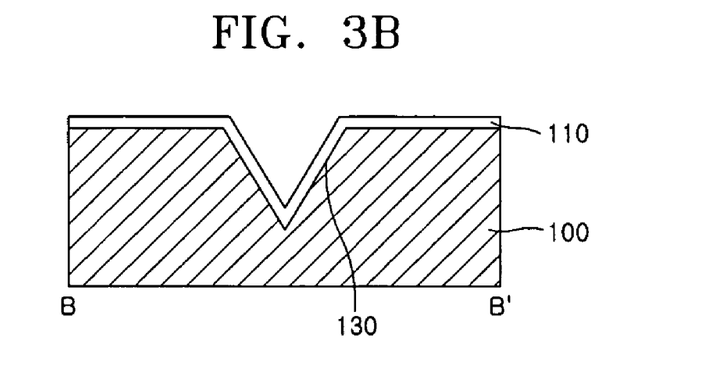

FIGS. 3A and 3B are schematic sectional views taken along lines of A–A' and B–B' of FIG. 1 respectively illustrating a process of forming an interconnection line 401 and a solder 403 according to an embodiment of the present invention.

Referring to FIGS. 3A and 3B, an insulating layer 110 is formed on the silicon substrate 100 having the V-shaped groove 130 formed thereon. The insulating layer 110 may be a silicon oxide layer ($SiO_2$) formed by a thermal oxidation, or the like. The insulating layer 110 of silicon oxide may be formed on the substrate 100, in specific, selectively formed on the optical active element mounting region 101, or may be formed extending also toward the optical waveguide region 103 and the inside of the groove 130.

The insulating layer 110 of silicon oxide may be used as a lower clad layer during a subsequent formation process of the optical waveguide. To do this, the insulating layer 110 may be formed extending toward the optical waveguide region 103.

After the insulating layer 110 is formed, in order to attach an optical active element on the substrate 100 of the optical active element mounting region 101, and transfer electrical signals, a metal interconnection line 401 is formed on the insulating layer 110, and a solder 403 of a ball shape or the like is formed on the interconnection line 401.

Figure 4A:
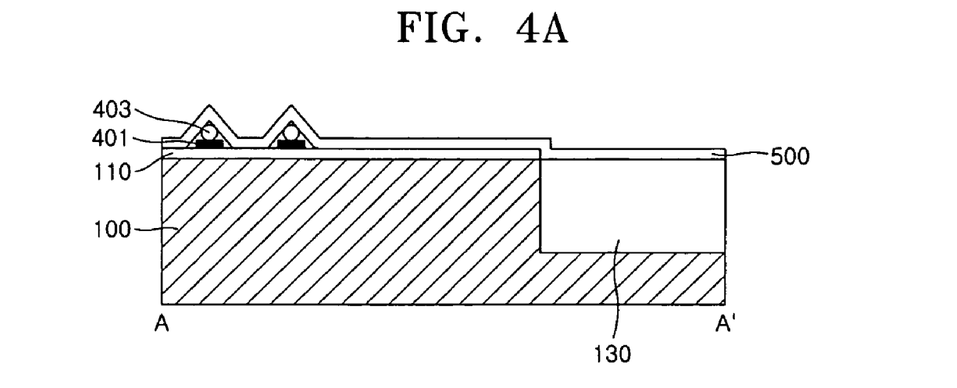
FIGS. 4A and 4B are schematic sectional views illustrating a process of forming a shielding layer covering a groove according to an embodiment of the present invention taken along lines of A–A' and B–B' of FIG. 1 respectively.
Figure 4B:
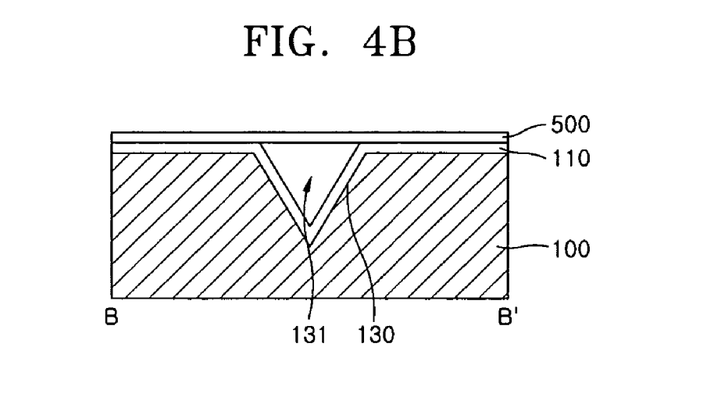

FIGS. 4A and 4B are schematic sectional views taken along lines of A–A' and B–B' of FIG. 1 respectively, illustrating a process of forming a shielding layer 500 covering the groove 130 according to an embodiment of the present invention.

Referring to FIGS. 4A and 4B, the shielding layer 500 for covering the groove 130 is attached on the insulating layer 110 of the substrate 100, in order to prevent polymer from coated inside the groove 130 or prevent a polymer thin film from being thin in thickness at the interface of the groove 130 and the polymer waveguide during the formation of the polymer thin film followed by a subsequent optical waveguide formation process. The shielding layer 500 may be a film type such as DFR, and is closely contacted with the insulating layer 110 to cover the groove 130. By applying heat to the adhered DFR film, the DFR film is attached to the insulating layer 110.

As shown in FIG. 4B, since the shielding layer 500 of the DFR film covers the top surface of the V-shaped groove 130 in flat, the inner portion 131 of the V-shaped groove 130 has only air thereinside. The shielding layer 500 may use a film-type thin film with a thickness of less than ten micro meters (μm).

Figure 5A:
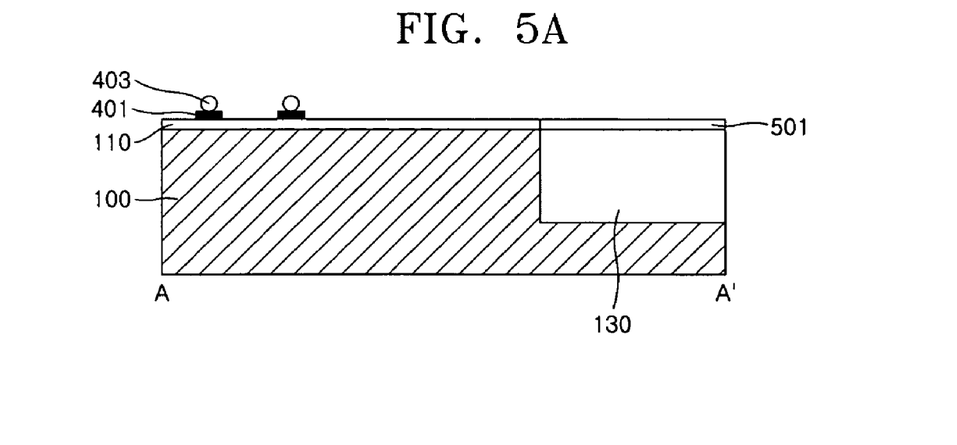
FIGS. 5A and 5B are schematic sectional views illustrating a process of patterning a shielding layer to expose an optical waveguide region adjacent to a groove according to an embodiment of the present invention taken along lines of A–A' and B–B' of FIG. 1 respectively.
Figure 5B:
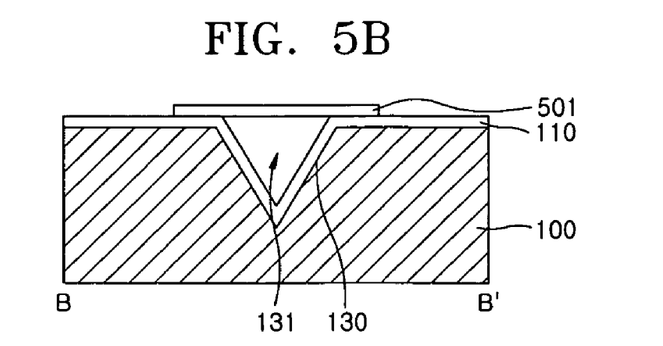

FIGS. 5A and 5B are schematic sectional views taken along lines of A–A' and B–B' of FIG. 1 respectively, illustrating a process of patterning the shielding layer 500 to expose an optical waveguide region 103 adjacent to the groove 130 according to an embodiment of the present invention.

Referring to FIGS. 5A and 5B, the shielding layer 500 is attached to the substrate 100, and the shielding layer 500 is patterned to form a shielding layer pattern 501 exposing at least the optical waveguide region 103 of the substrate 100 except for the portion covering the groove 130. In the case that the shielding layer 500 is composed of DFR, the DFR in the rest of the region except for the region of the V-shaped groove 130 is removed performing a photolithography patterning process and an etch process, that is, exposure and development process, as shown in FIG. 5A. Since DFR has a property of being easily removable by a development or a wet etch, the patterning process is possible.

Figure 6A:
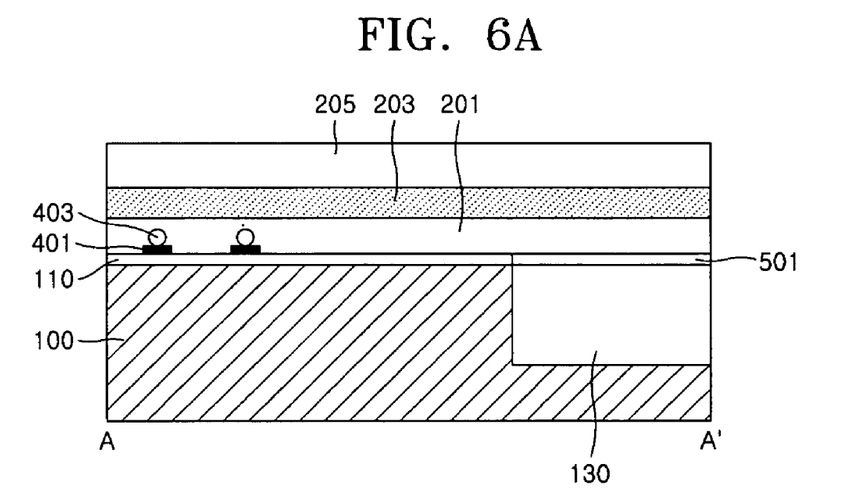
FIGS. 6A and 6B are schematic sectional views illustrating a process of forming layers for an optical waveguide according to an embodiment of the present invention taken along lines of A–A' and B–B' of FIG. 1 respectively.
Figure 6B:
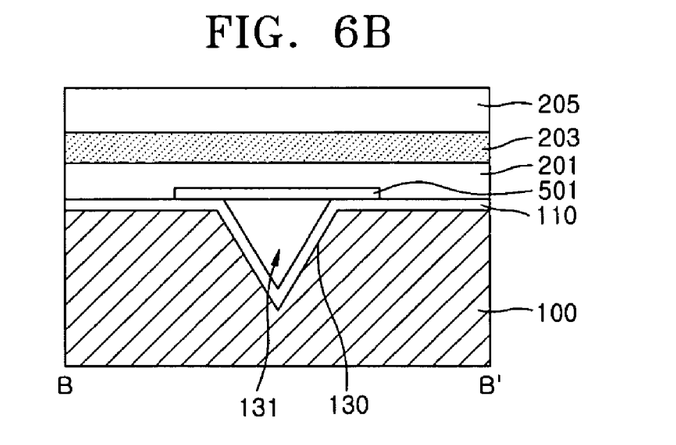

FIGS. 6A and 6B are schematic sectional views taken along lines of A–A' and B–B' of FIG. 1 respectively, illustrating a process of forming layers for an optical waveguide according to an embodiment of the present invention.

Referring to FIGS. 6A and 6B, a lower clad layer 201, a core layer 203, and an upper clad layer 205 for an optical waveguide are sequentially formed on the substrate 100. Since the lower clad layer 201 can be replaced with the insulating layer 110, the formation process of the lower clad layer 201 may be omitted.

The lower clad layer 201, the core layer 203 or/and the upper clad layer 205 may be respectively formed by spin-coating the polymer suitable for the purpose of each layer. For example, the lower clad layer 201 may be formed by spin-coating an appropriate polymer thin film and hardening the film by ultraviolet rays or heat, and the core layer 203 and the upper clad layer 205 may be formed by spin-coating an appropriate polymer thin film and hardening the film by ultraviolet rays or heat. The core layer 203 may be formed using the polymer having an index of refraction being higher than that of the upper clad layer 205. By patterning the core layer 203 before spin-coating the upper clad layer 205, the upper clad layer 205 covers and shields the sides of the patterned core layer 203 as shown in FIG. 1.

Since the groove 130 is covered by the shielding layer pattern 501, it is prevented that the polymer flows into the groove 130 during the spin-coating of the polymers. Further, the shielding layer pattern 501 is allowed such that the height of the polymer layer spin-coated thereon can be maintained same as the height of the polymer layer spin-coated on the surface of the substrate 100 of other region. Therefore, the spin-coated polymer layer may be formed of a thin film having a substantially uniform thickness and height.

The thickness of the lower clad layer 201 may be several to tens of micro meter (μm), the thickness of the core layer 203 may be approximately several micro meter (μm), for example, 6 to 7 μm, and thickness of the upper clad layer 205 may be approximately tens of micro meter (μm), for example, 20 μm. Therefore, a total thickness of the layers for an optical waveguide 201, 203, 205 may be about 20 to 25 μm.

Unless the shielding layer pattern 501 is employed, the layers for an optical waveguide 201, 203, 205 may flow into the groove 130 during the spin-coating processes for the thin film formation. Thus, the portion of the layers for an optical waveguide adjacent to the groove 130 is relatively lowered in height due to the step height difference of the inside of the groove 130 and the surface of other portion of the substrate 100. The non-uniformity of the height or/and thickness of the layers for an optical waveguide very poorly deteriorates the alignment accuracy for the optical coupling between optical fibers induced to the optical waveguide and the groove 130. The generation of defects badly affecting the alignment accuracy of the optical coupling can be effectively prevented by employing the shielding layer pattern 501 in the embodiment of the present invention.

Figure 7A:
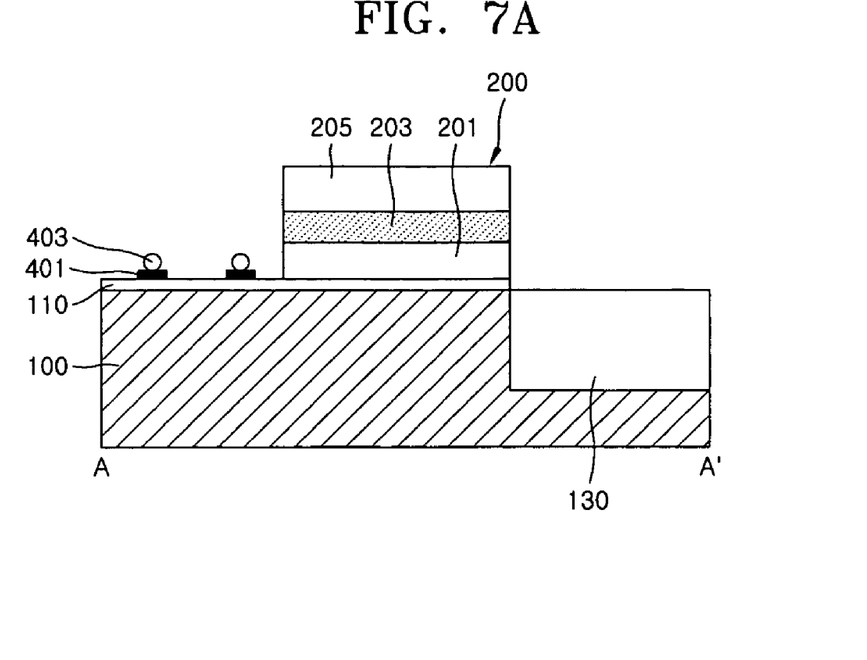
FIGS. 7A and 7B are schematic sectional views illustrating a process of patterning an optical waveguide according to an embodiment of the present invention taken along lines of A–A' and B–B' of FIG. 1 respectively.
Figure 7B:
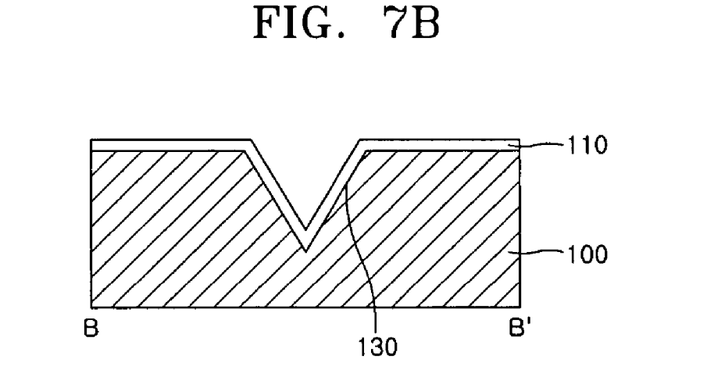

FIGS. 7A and 7B are schematic sectional views taken along lines of A–A' and B–B' of FIG. 1 respectively, illustrating a process of patterning the optical waveguide according to an embodiment of the present invention.

Referring to FIGS. 7A and 7B, the upper clad layer 205, the core layer 203, and the lower clad layer 201 are etched to expose the solder 403 and the metal interconnection line 401 of the optical active element mounting region 101, thereby patterning the optical waveguide 200. Since the upper clad layer 205, the core layer 203, and the lower clad layer 201 may be composed of polymer, they can be patterned by a dry etch. Meanwhile, to expose the portion of the V-shaped groove 130 in the optical fiber coupling region 105, the upper clad layer 205, the core layer 203, the lower clad layer 201, and the shielding layer pattern 501 of DFR film are etched, thereby to expose the inside 131 of the V-shaped groove 130. Thus, the groove 130 is exposed for an optical fiber to be alignedly inserted thereinto.

As such, since the patterned optical waveguide 200 is formed by patterning the upper clad layer 205, the core layer 203, and the lower clad layer 201, which are formed with uniform height and thickness, each component layer, that is, the upper clad layer 205, the core layer 203, and the lower clad layer 201 is formed with uniform height and thickness throughout the whole range.

Figure 8B:
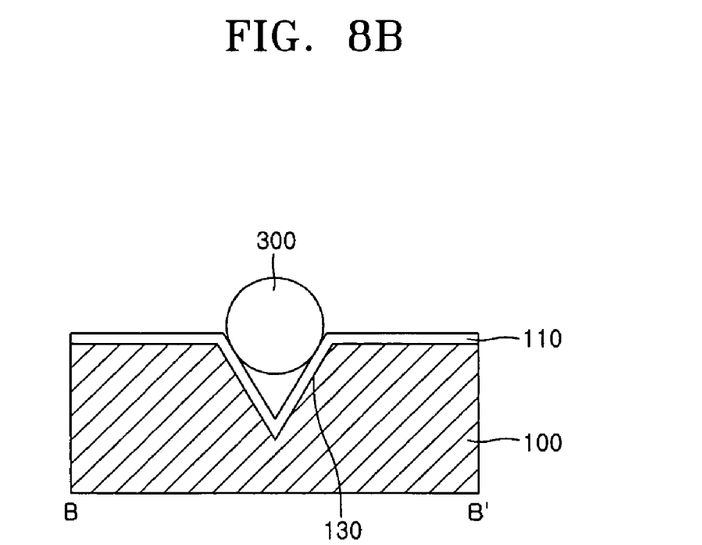

FIGS. 8A and 8B are schematic sectional views taken along lines of A–A' and B–B' of FIG. 1 respectively, illustrating a process of aligning an optical fiber 300 to the optical waveguide 200 according to an embodiment of the present invention.

Referring to FIGS. 8A and 8B, optical active elements 400 are mounted on the optical active element mounting region 101 such that the optical active element 400 is electrically connected to a metal interconnection line 401 through a solder 403. Further, by inserting the optical fiber 300 into the V-shaped groove 130 in the optical fiber coupling region 105, a core layer (not shown) of the optical fiber 300 and the core layer 203 of the optical waveguide 200 are aligned, thereby forming an optical module.

The width of the core layer 203 of the optical waveguide 200 is about 6 to 7 μm as shown in FIG. 1. The optical fiber 300 may have a diameter of about 125 μm, but the central portion or the core portion to be aligned to the core layer 203 of the optical waveguide 200 for the optical coupling is just about 8 to 9 μm. Thus, when aligning the central portion of the optical fiber 300 to the core layer 203 of the optical waveguide 200, the process margin is 1 μm or lower than 1 μm at most. Therefore, a process of mounting the optical fiber 300 to the V-shaped groove 130 for the core layer 203 of the optical waveguide 200 to be aligned with the core of the optical fiber 300 should be performed very precisely.

In the embodiment of the present invention, the V-shaped groove 130 is formed precisely and the optical waveguide 200 is formed. Particularly, since the portion around the groove 130 can be protected by the shielding layer pattern 501 when the optical waveguide 200 is formed using polymer, the defect such as the optical waveguide 200 is undesirably lowered at its corner non-uniformly due to the step height difference of the groove 130. Further, it is prevented that the groove 130 is damaged during the formation of the optical waveguide 200.

Therefore, the groove 130 may be formed very precisely and maintained, and the optical waveguide 200 may be formed to be aligned with the groove 130 very precisely. Thus, the optical fiber 300 having the core with a relatively great width can be passively aligned to the core layer 203 of the optical waveguide 200 with a very narrow width effectively. Therefore, the optical coupling efficiency of the optical fiber 300 and the optical waveguide 200 can be greatly improved.

As described above, the method of fabricating the optical module using the polymer waveguide according to the present invention can provide the optical module allowing an optical passive alignment, by forming the metal interconnection line, the solder, the V-shaped groove, or the like before forming the optical waveguide, and using the DFR thin film during the formation of the V-shaped groove.

One example of the method of fabricating an optical module according to an embodiment of the present invention may include forming a groove on which an optical fiber is mounted on a substrate, forming a shielding layer pattern for selectively shielding the groove, forming layers for an optical waveguide extending to the shielding layer pattern, patterning the layers to form an optical waveguide, removing the shielding layer to expose the groove, and mounting the optical fiber aligned to the optical waveguide on the groove.

The operation of forming the shielding layer pattern may include attaching a photoresist film-type thin film on the substrate to cover the groove, and patterning the film-type thin film to form the shielding layer pattern selectively covering the groove and exposing the rest portion of the substrate. The photoresist film-type thin film may use a thin film of dry film photoresist (DFR). The thin film of DFR may be patterned using a selective exposure and a development process.

One of the layers for an optical waveguide may be formed on the substrate by a spin-coating. One of the layers for an optical waveguide may be formed of a polymer layer. The operation of patterning the optical waveguides includes patterning the polymer layer by a dry etch, and the shielding layer can be etched and removed by the dry etch. The layers for an optical waveguide may include a lower clad layer, a core layer, and an upper clad layer, which are respectively composed of polymer.

The method may further include forming an insulating layer on the substrate before forming the shielding layer pattern. The optical waveguide uses the insulating layer as the lower clad layer, and the layers for an optical waveguide may be formed of the core layer and the upper clad layer, which are disposed on the insulating layer and composed of polymer respectively.

The method may further include sequentially forming a metal interconnection line and a solder on the insulating layer, and mounting an optical active element, which is electrically connected to the metal interconnection line, on the solder. The insulating layer may be composed of silicon oxide.

According to the present invention described as above, a technology of using a polymer waveguide may be explained to fabricate a low-priced optical module.

In specific, by etching the silicon substrate with a V-shaped or a U-shaped groove, forming an interconnection line (or electrode) for mounting an optical active element and a solder, and forming a polymer waveguide, the patterning process can be performed, while effectively preventing the generation of a step height difference between a photoresist layer and a photo mask during the photolithography patterning process. That is, a step height difference due to the optical waveguide during the photolithography patterning process of forming the groove is prevented from being generated. Therefore, an alignment accuracy of the process can be increased, and a precise optical module can be fabricated.

Further, by the use of the shielding layer for shielding the groove, it is effectively prevented that the spin-coated polymer is non-uniform in thickness due to the existence of the V-shaped or the U-shaped groove during the formation of the polymer waveguide. The shielding layer may be formed of a photoresist material film, for example, by attaching a DFR film to the substrate to cover the groove.

Therefore, an increase of the optical coupling loss between the optical waveguide and the optical fiber due to the non-uniformity of the polymer thickness can be prevented. Further, the polymer thin layers for an optical waveguide may be formed with very uniform thickness and height while they are formed by a spin-coating, and thus, the optical waveguide formed by patterning the polymer thin layers may be passively aligned to the optical fiber with a very high alignment accuracy. Therefore, the coupling efficiency of the optical fiber and the polymer waveguide can be effectively increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a polymer waveguide for passive alignment to an optical fiber comprising:
   forming a groove, on which an optical fiber is mounted, on a substrate;
   forming a shielding layer pattern selectively shielding the groove;
   forming layers for an optical waveguide, which extend to the shielding layer pattern, on the substrate;
   patterning the layers, thereby forming an optical waveguide;
   removing the shielding layer, thereby exposing the groove; and
   mounting an optical fiber, which is aligned to the optical waveguide, on the groove.

2. The method of claim 1, further comprising forming an insulating layer on the substrate before forming the shielding layer pattern.

3. The method of claim 2, wherein the optical waveguide uses the insulating layer as the lower clad layer, and the layers for an optical waveguide comprise a core layer and an upper clad layer, which are formed on the insulating layer and composed of polymer respectively.

4. The method of claim 2, further comprising:
   sequentially forming a metal interconnection line and a solder on the insulating layer; and
   mounting an optical active element, electrically connected to the metal interconnection line, on the solder.

5. The method of claim 2, wherein the insulating layer is composed of silicon oxide.

6. The method of claim 1, wherein the operation of forming the shielding layer pattern comprises;
   attaching a photoresist-type thin film on the substrate to cover the groove; and
   patterning the thin film, thereby forming the shielding layer pattern selectively covering the groove and exposing the rest portion of the substrate.

7. The method of claim 6, wherein the photoresist-type thin film uses a dry film photoresist (DFR) thin film.

8. The method of claim 7, wherein the dry film photoresist thin film is patterned by a selective exposure and a development process.

9. The method of claim 1, wherein one of the layers for an optical wave guide is formed on the substrate by a spin-coating.

10. The method of claim 1, wherein one of the layers for an optical waveguide is formed of a polymer layer.

11. The method of claim 1, wherein the operation of patterning the layers comprises patterning the polymer layer by a dry etch, and the shielding layer is etched and removed by the dry etch.

12. The method of claim 1, wherein each of the layers for an optical waveguide comprises a lower clad layer, a core layer, and an upper layer, which are composed of polymer respectively.

13. A method of fabricating a polymer waveguide for passive alignment to an optical fiber comprising:

forming a groove, on which an optical fiber is mounted, on a substrate;

attaching a photoresist-type thin film to the substrate to cover the groove;

patterning the thin film, thereby forming a shielding layer pattern selectively shielding the groove and exposing a remaining portion of the substrate;

forming layers for an optical waveguide, which extend to the shielding layer pattern, on the substrate;

patterning the layers, thereby forming an optical waveguide;

removing the shielding layer, thereby exposing the groove; and mounting an optical fiber, which is aligned to the optical waveguide, on the groove.

14. The method of claim 13, wherein the photoresist-type thin film uses a dry film photoresist (DFR) thin film.

15. The method of claim 14, wherein the dry film photoresist thin film is patterned by a selective exposure and a development process.

16. A method of fabricating a polymer waveguide for passive alignment to an optical fiber comprising:

forming a groove, on which an optical fiber is mounted, on a substrate;

attaching a photoresist-type thin film to the substrate to cover the groove;

patterning the thin film, thereby forming a shielding layer pattern selectively shielding the groove and exposing a remaining portion of the substrate;

forming layers for an optical waveguide, which extend to the shielding layer pattern, and include polymer layers, on the substrate;

patterning the layers, thereby forming an optical waveguide;

removing the shielding layer, thereby exposing the groove; and mounting an optical fiber, which is aligned to the optical waveguide, on the groove.

17. The method of claim 16, wherein the photoresist-type thin film uses a dry film photoresist (DFR) thin film.

18. The method of claim 16, wherein the operation of patterning the layers for an optical waveguide comprises patterning the polymer layer by a dry etch, and the shielding layer is etched and removed by the dry etch.

19. The method of claim 16, further comprising forming an insulating layer on the substrate before forming the shielding layer pattern, in which the optical waveguide uses the insulating layer as the lower clad layer, and the layers for an optical waveguide comprise a core layer and an upper clad layer, which are formed on the insulating layer and composed of polymer respectively.

20. The method of claim 19, further comprising:

sequentially forming a metal interconnection line and a solder on the insulating layer; and mounting an optical active element, electrically connected to the metal interconnection line, on the solder.

* * * * *